(12) United States Patent
Chan et al.

(10) Patent No.: US 7,688,542 B2
(45) Date of Patent: Mar. 30, 2010

(54) METHOD TO IDENTIFY SHORT SPIRALS

(75) Inventors: Kwong T. Chan, Pleasanton, CA (US);
Linh N. Nguyen, San Jose, CA (US);
Stanley H. Shepherd, Morgan Hill, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 48 days.

(21) Appl. No.: 12/217,443

(22) Filed: Jul. 2, 2008

(65) Prior Publication Data
US 2010/0002333 A1 Jan. 7, 2010

(51) Int. Cl.
*G11B 5/596* (2006.01)
(52) U.S. Cl. .................................... 360/77.05
(58) Field of Classification Search .......... None
See application file for complete search history.

(56) References Cited
U.S. PATENT DOCUMENTS 5,668,679 A    9/1997  Swearingen et al.
6,035,351 A *  3/2000  Billings et al. ................ 710/74
7,133,239 B1 * 11/2006 Hartman et al. .............. 360/75
7,414,809 B2 *  8/2008  Smith et al. ............ 360/77.08
7,561,359 B1 *  7/2009  Jeong et al. ................... 360/48

* cited by examiner

*Primary Examiner*—K. Wong
(74) *Attorney, Agent, or Firm*—Ben J. Yorks; Irell & Manella LLP

(57) ABSTRACT

A method for writing servo onto a disk of a hard disk drive with a servo writer. The method includes writing a plurality of spiral servo signals onto a disk. The spiral servo signals include a plurality of short spirals separated by unequal distances. The short spirals are detected by determining the unequal distances and used to write a plurality of servo patterns. The unequal distances provide information of the short spirals at different quadrants of the disk. The distances between a bank of odd short spirals is different than a bank of even short spirals which allows the servo writer to determine whether the bank is odd or even without switching banks. Either the even or odd bank of short spirals can be used to locate a starting reference point from which the servo writer can count spirals and write A, B, C and D servo bursts.

8 Claims, 5 Drawing Sheets

METHOD TO IDENTIFY SHORT SPIRALS

BACKGROUND OF THE INVENTION

1. Field of the Invention

The present invention relates to a method for writing servo onto disks of a hard disk drive.

2. Background Information

Hard disk drives contain a plurality of magnetic heads that are coupled to rotating disks. The heads write and read information by magnetizing and sensing the magnetic fields of the disk surfaces. Each head is attached to a flexure arm to create a subassembly commonly referred to as a head gimbal assembly ("HGA"). The HGAs are suspended from an actuator arm. The actuator arm has a voice coil motor that can move the heads across the surfaces of the disks.

Information is stored in radial tracks that extend across the surface of each disk. Each track is typically divided into a number of segments or servo sectors. The voice coil motor and actuator arm can move the heads to different tracks of the disks.

FIG. 1 shows a track that has a number of fields associated with each servo sector. A sector may include an automatic gain control ("AGC") field 1 that is used to adjust the strength of the read signal, a sync field 2 to establish a timing reference for the circuits of the drive, and ID 3 and Gray Code 4 fields to provide sector and track identification.

Each sector may have also a servo field 5 located adjacent to a data field 6. The servo field 5 contains a plurality of servo bits A, B, C and D that are read and used to position the head 7 relative to the track.

The fields 1-5 must be written onto the disk surfaces during the manufacturing process of the disk drive. These fields are typically written with a servo writer. The servo tracks are sometimes written using a number of spiral servo tracks initially written onto the disks. FIG. 2 shows an example of a number of spiral servo tracks written onto a disk. Using spiral servo tracks is sometimes referred to as an Ammonite servo write process. The spiral servo tracks are used to write the final radial servo tracks that are utilized during the normal operation of the disk drive. This process is described in U.S. Pat. No. 5,668,679 issued to Swearingen et al.

As shown in FIG. 3, the disk has a plurality of spiral servo patterns incrementally spaced across the surface of the disk. To write servo the servo writer reads the disk to detect a spiral servo signal. The servo writer uses the detected spiral servo signal to time the writing of a permanent A, B, C and D servo burst pattern.

When writing servo with spiral servo signals a start position must be identified and then the spirals must be counted to accurately write the A, B, C and D servo burst patterns. Some spiral techniques utilize a reference track to find the start position. Reference tracks can be difficult to write on disks that have relatively high track per inch requirements.

Another approach is to write a number of short spirals that have a start position that is delayed from the other spirals. The short spirals provide a unique radial reference point. The short spirals are located near rotational symmetry points to provide a unique angular reference point.

The number of spirals is typically twice the number of servo "spokes". At any given time one-half of the spirals, either even or odd sets, are used to write the servo. There are typically 4 pairs of even/odd short spirals that are evenly spaced about the disk. Present short spiral techniques do not provide accurate sufficient information to distinguish even versus odd sets of spirals without examining both sets.

BRIEF SUMMARY OF THE INVENTION

A method for writing servo onto a disk of a hard disk drive. The method includes writing a plurality of spiral servo signals onto a disk. The spiral servo signals include a plurality of short spirals separated by unequal distances. The short spirals are detected by determining the unequal distances and used to write a plurality of servo patterns.

DETAILED DESCRIPTION

Disclosed is a method for writing servo onto a disk of a hard disk drive with a servo writer. The method includes writing a plurality of spiral servo signals onto a disk. The spiral servo signals include a plurality of short spirals separated by unequal distances. The short spirals are detected by determining the unequal distances and used to write a plurality of servo patterns. The unequal distances provide information of the short spirals at different quadrants of the disk. The distances between a bank of odd short spirals is different than a bank of even short spirals which allows the servo writer to determine whether the bank is odd or even without switching banks. Either the even or odd bank of short spirals can be used to locate a starting reference point from which the servo writer can count spirals and write A, B, C and D servo bursts.

Figure 4:
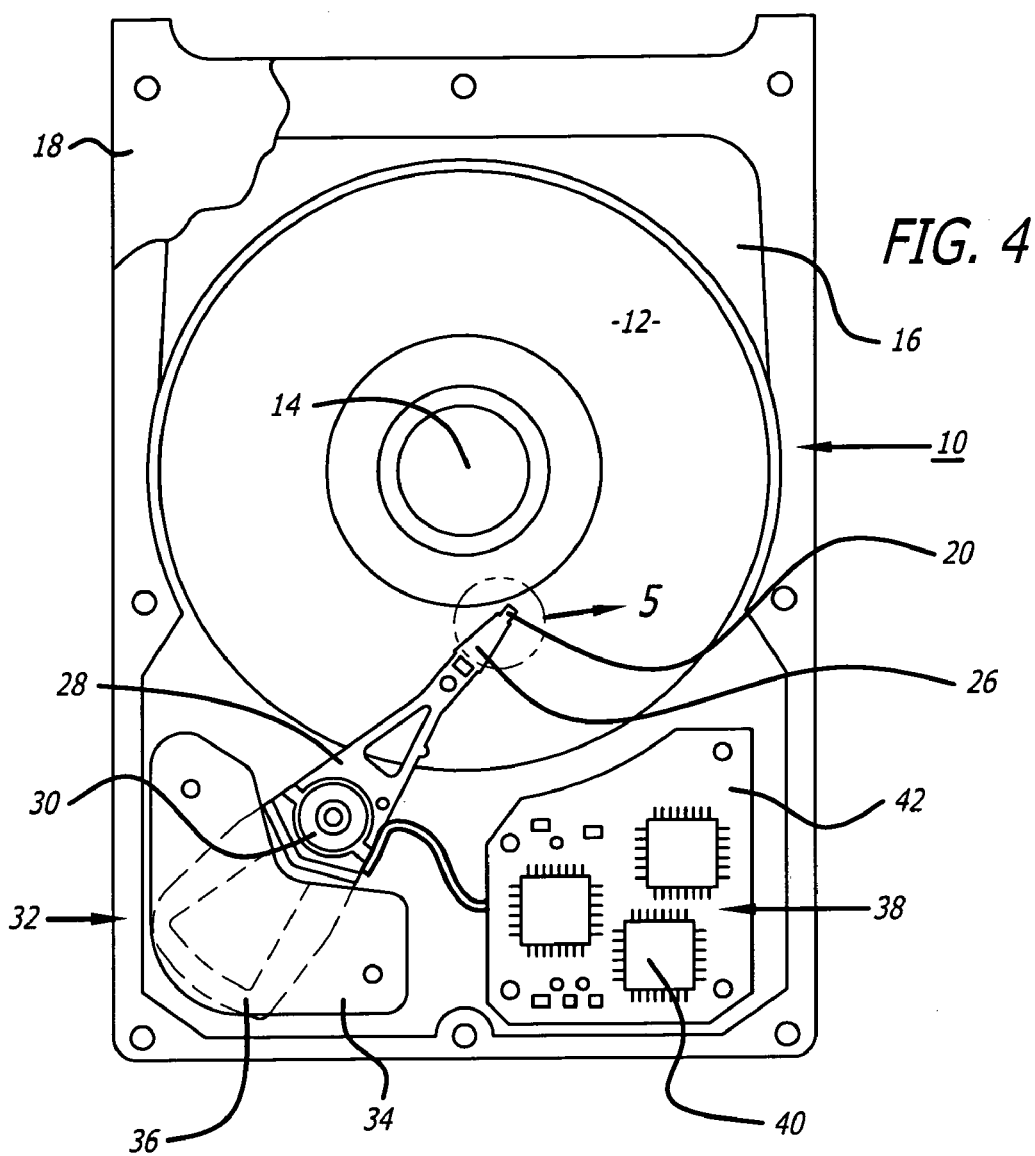
FIG. 4 is a top view of an embodiment of a hard disk drive.

Referring to the drawings more particularly by reference numbers, FIG. 4 shows an embodiment of a hard disk drive 10. The disk drive 10 may include one or more magnetic disks 12 that are rotated by a spindle motor 14. The spindle motor 14 may be mounted to a base plate 16. The disk drive 10 may further have a cover 18 that encloses the disks 12.

Figure 5:
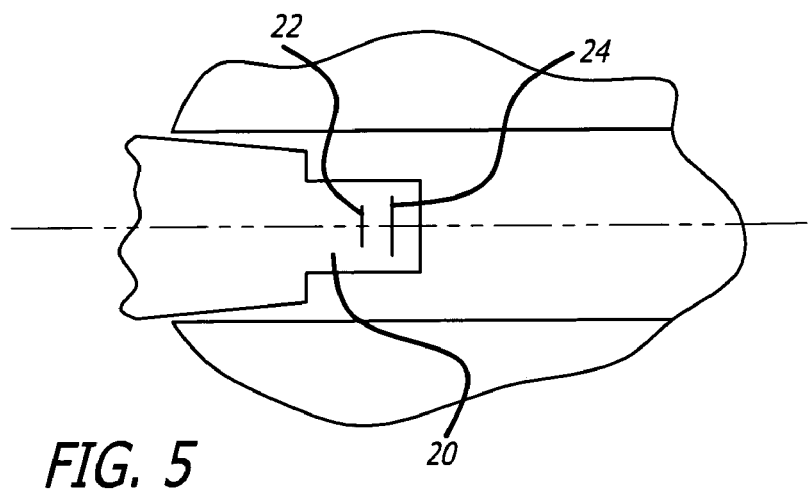
FIG. 5 is a top enlarged view of a head of the hard disk drive.

The disk drive 10 may include a plurality of heads 20 located adjacent to the disks 12. As shown in FIG. 5 the heads 20 may have separate write 22 and read elements 24. The write element 22 magnetizes the disk 12 to write data. The read element 24 senses the magnetic fields of the disks 12 to read data. By way of example, the read element 24 may be constructed from a magneto-resistive material that has a resistance which varies linearly with changes in magnetic flux.

Referring to FIG. 4, each head 20 may be gimbal mounted to a flexure arm 26 as part of a head gimbal assembly (HGA). The flexure arms 26 are attached to an actuator arm 28 that is pivotally mounted to the base plate 16 by a bearing assembly 30. A voice coil 32 is attached to the actuator arm 28. The voice coil 32 is coupled to a magnet assembly 34 to create a voice coil motor (VCM) 36. Providing a current to the voice coil 32 will create a torque that swings the actuator arm 28 and moves the heads 20 across the disks 12.

The hard disk drive 10 may include a printed circuit board assembly 38 that includes a plurality of integrated circuits 40 coupled to a printed circuit board 42. The printed circuit board 40 is coupled to the voice coil 32, heads 20 and spindle motor 14 by wires (not shown).

Figure 6:
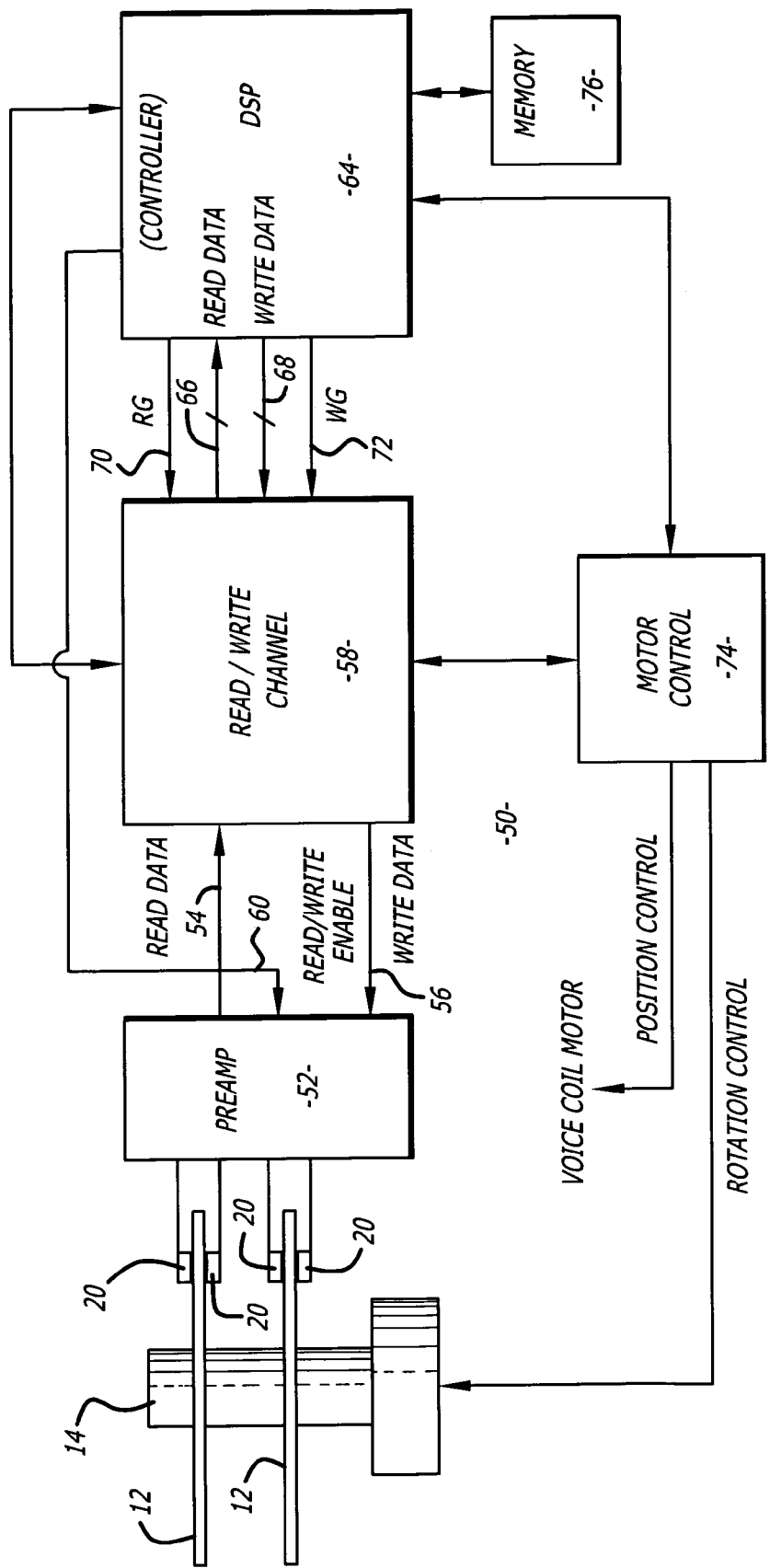
FIG. 6 is a schematic of an electrical circuit for the hard disk drive.

FIG. 6 shows an electrical circuit 50 for reading and writing data onto the disks 12. The circuit 50 may include a pre-amplifier circuit 52 that is coupled to the heads 20. The pre-amplifier circuit 52 has a read data channel 54 and a write data channel 56 that are connected to a read/write channel circuit 58. The pre-amplifier 52 also has a read/write enable gate 60 connected to a controller 64. Data can be written onto the disks 12, or read from the disks 12 by enabling the read/write enable gate 60.

The read/write channel circuit 58 is connected to a controller 64 through read and write channels 66 and 68, respectively, and read and write gates 70 and 72, respectively. The read gate 70 is enabled when data is to be read from the disks 12. The write gate 72 is to be enabled when writing data to the disks 12. The controller 64 may be a digital signal processor that operates in accordance with a software routine, including a routine(s) to write and read data from the disks 12. The read/write channel circuit 62 and controller 64 may also be connected to a motor control circuit 74 which controls the voice coil motor 36 and spindle motor 14 of the disk drive 10. The controller 64 may be connected to a non-volatile memory device 76. By way of example, the device 76 may be a read only memory ("ROM") that contains instructions that are read by the controller 64.

Figure 7:
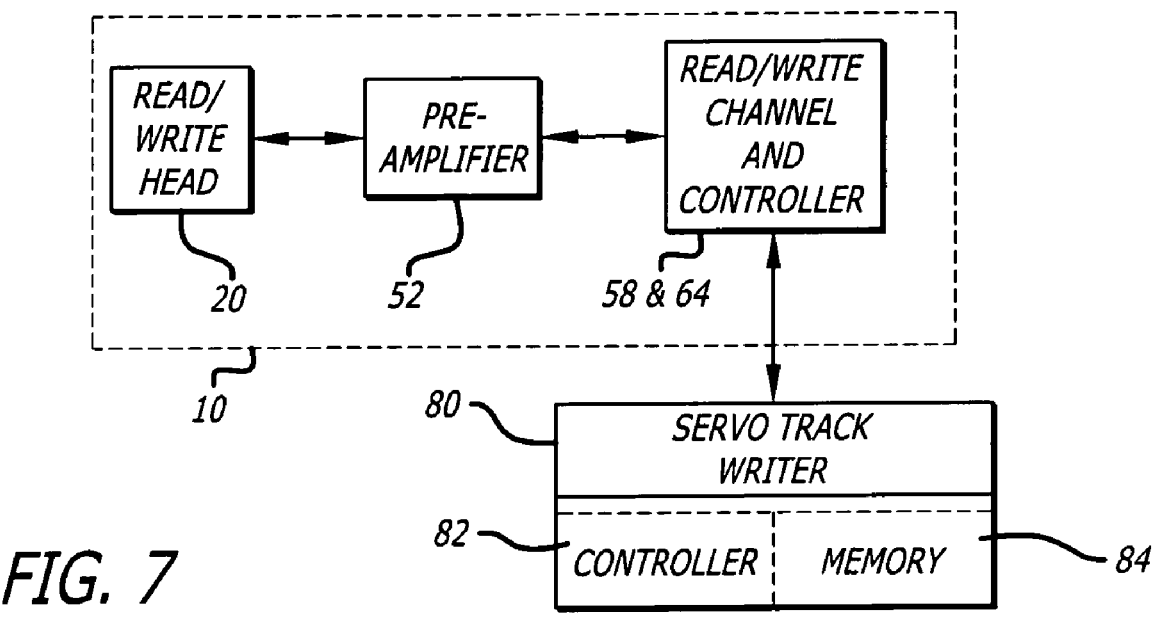
FIG. 7 is a schematic showing a servo writer connected to the hard disk drive.

During the manufacturing process of the disk drive 10 servo information must be written onto the disks 12. This is typically done with a servo track writer. FIG. 7 shows a servo track writer 80 connected to a hard disk drive 10. The servo track writer 80 may include a controller 82, memory 84 and other circuitry for writing servo information onto the disk(s) of the disk drive. The servo writer 80 may utilize the pre-amplifier, read/write channel, etc. of the disk drive to write servo information. The servo writer 80 may also employ the circuits of the disk drive to read servo information and position a head onto a track of the disk(s).

Figure 1:
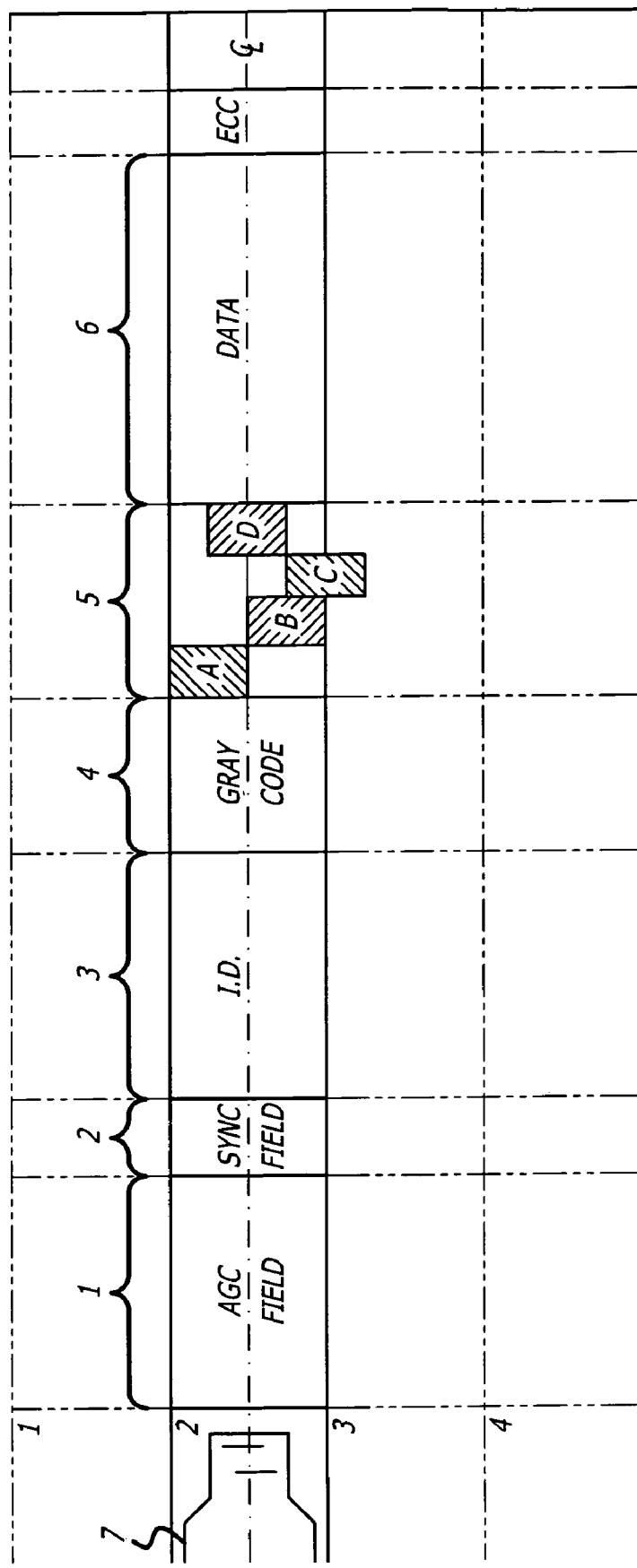
FIG. 1 is an illustration of a track of the prior art.
Figure 2:
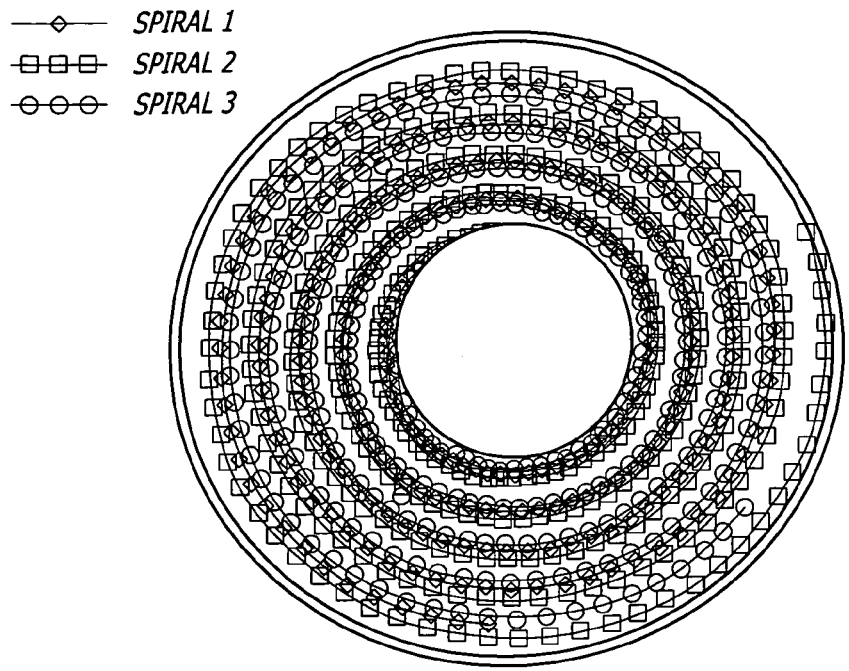
FIG. 2 is an illustration showing a plurality of spiral servo tracks written onto a disk in the prior art.
Figure 3:
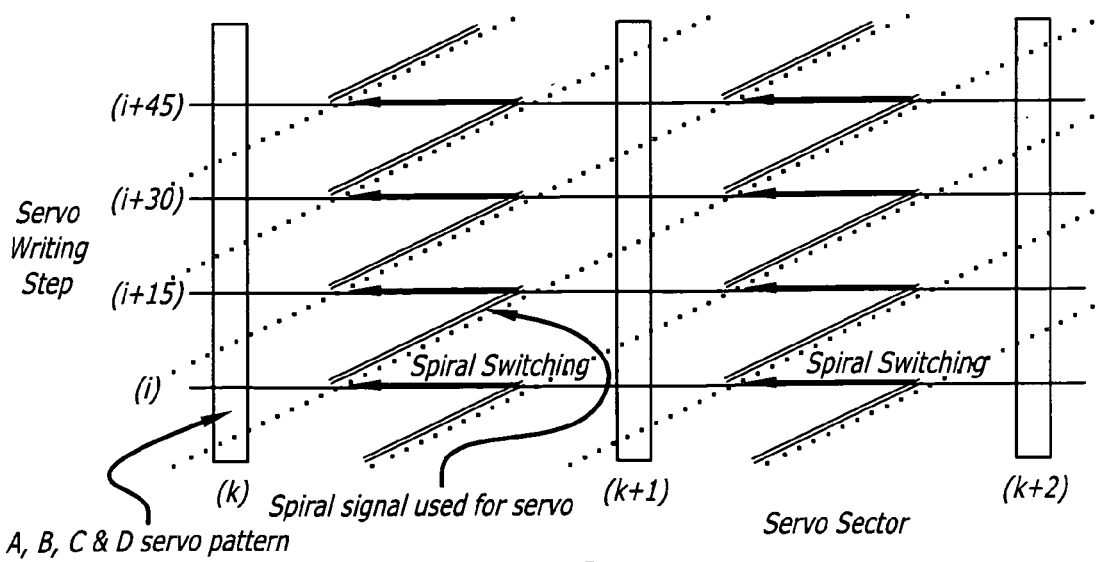
FIG. 3 is an illustration showing a plurality of spiral servo patterns used to write A, B, C and D servo bit patterns in the prior art.

The servo writer 80 causes the disk drive 10 to write a plurality of spiral servo signals such as the patterns shown in FIGS. 2 and 3. The writing of spiral servo signals may the same or similar to the process described in U.S. Pat. No. 5,668,679 issued to Swearingen et al., which is hereby incorporated by reference. The pattern includes a plurality of short spirals that are used to determine a starting reference point.

The short spirals can be defined in terms of groups of even short spirals and groups of odd short spirals written in short spiral pairs. The distance between the short spirals are unequal to provide angular information at different quadrants of the disk. By way of example, there may be 4 even short spirals and 4 odd short spirals where the location of the short spirals on the disk is identified by the following equations.

1st even short spiral:$(2N/4+1)*[1]i$; 1st odd short spiral: $((2N/4+1)*i)+1$ for i=0

2nd odd short spiral:$(2N/4+1)*[1]i$; 2nd even short spiral: $((2N/4+1)*i)+1$ for i=1

3rd even short spiral:$(2N/4+1)*[1]i$; 3rd odd short spiral: $((2N/4+1)*i)+1$ for i=2

4th odd short spiral:$(2N/4+1)*[1]i$; 4th even short spiral:$((2N/4+1)*i)+1$ for i=3

For example if N=240 the short spirals are located at the following locations:

1st even short spiral:0, 1st odd short spiral:1

2nd odd short spiral:121; 2nd even short spiral:122

3rd even short spiral:242; 3rd odd short spiral:243

4th odd short spiral:363; 4th even short spiral:364

To write servo patterns the servo writer initially looks for a starting reference point. The writer can find either an even bank of spirals or an odd band of short spirals by determining the unequal spacing between spirals. For example, if N=240 then the identity of 4 even short spirals and the spacing is provided by the table below.

| | Short Spiral Id | Servo Sector Id | Distance to the next short spiral |
|---|---|---|---|
| 1st even short spiral | 0 | 0 | 61 |
| 2nd even short spiral | 122 | 61 | 60 |
| 3rd even short spiral | 242 | 121 | 61 |
| 4th even short spiral | 364 | 182 | 58 |

The identity of the 4 odd short spirals and the spacing is provided by the following table.

| | Short Spiral Id | Servo Sector Id | Distance to the next short spiral |
|---|---|---|---|
| 1st odd short spiral | 1 | 0 | 60 |
| 2nd odd short spiral | 121 | 60 | 61 |
| 3rd odd short spiral | 243 | 121 | 60 |
| 4th odd short spiral | 363 | 181 | 59 |

The distances between the bank of odd short spirals is different than the bank of even short spirals which allows the servo writer to determine whether the bank is odd or even without switching banks. Either the even or odd bank of short spirals can be used to locate a starting reference point from which the servo writer can count spirals and write A, B, C and D servo bursts.

While certain exemplary embodiments have been described and shown in the accompanying drawings, it is to be understood that such embodiments are merely illustrative of and not restrictive on the broad invention, and that this invention not be limited to the specific constructions and arrangements shown-and described, since various other modifications may occur to those ordinarily skilled in the art.

What is claimed is:

1. A method for writing servo information onto a disk of a hard disk drive, comprising:
writing a plurality of spiral servo signals onto a disk, the spiral servo signals including a plurality of short spirals separated by unequal distances, the short spirals include a group of odd short spirals separated by unequal odd spiral distances and a group of even short spirals separated by unequal even spiral distances;
detecting the short spirals and whether the short spirals are odd or even short spirals by determining the unequal distances;
writing a plurality of servo patterns utilizing the detected short spirals.

2. The method of claim 1, wherein the unequal distances are determined by equations $(2N/4+1)*i$ and $((2N/4+1)*i)+1$, where N is a number of servo sectors per revolution of the disk and i is the number of said short spirals.

3. The method of claim 1, wherein there are 4 odd short spirals and 4 even short spirals.

4. The method of claim 2, wherein N is equal to 240.

5. A servo writer that writes servo information onto a disk of a hard disk drive, comprising:

a controller that causes a writing of a plurality of spiral servo signals onto a disk, the spiral servo signals including a plurality of short spirals separated by unequal distances, the short spirals include a group of odd short spirals separated by unequal odd spiral distances and a group of even short spirals separated by unequal short spiral distances, the controller further causes a detecting of the short spirals and whether the short spirals are odd or even short spirals by determining the unequal distances, and a writing of a plurality of servo patterns utilizing the detected short spirals.

6. The servo writer of claim 5, wherein the unequal distances are determined by equations $(2N/4+1)*i$ and $((2N/4+1)*i)+1$, where N is a number of servo sectors per revolution of the disk and i is the number of said short spirals.

7. The servo writer of claim 5, wherein there are 4 odd short spirals and 4 even short spirals.

8. The servo writer of claim 6, wherein N is equal to 240.

* * * * *